United States Patent [19]

Yoshino et al.

[11] 4,397,808

[45] Aug. 9, 1983

[54] PRODUCTION OF A BOTTLE OF SATURATED POLYESTER RESIN

[75] Inventors: Yataro Yoshino; Akiho Ota; Hiroaki Sugiura, all of Tokyo, Japan

[73] Assignee: Yoshino Kogyosho Co., Ltd., Tokyo, Japan

[21] Appl. No.: 244,932

[22] Filed: Mar. 19, 1981

Related U.S. Application Data

[62] Division of Ser. No. 82,698, Oct. 9, 1979.

[51] Int. Cl.³ .............................................. B29C 17/07
[52] U.S. Cl. .................................... 264/521; 264/532; 264/533; 264/537; 264/296; 264/322; 425/525
[58] Field of Search ............... 264/521, 533, 532, 537, 264/538, 296, 323, 322; 425/525, 533

[56] References Cited

U.S. PATENT DOCUMENTS

| | | | |
|---|---|---|---|
| 3,164,646 | 1/1965 | Fischer | 264/296 X |
| 3,492,387 | 1/1970 | Larson | 264/537 X |
| 3,608,032 | 9/1971 | Boultinghouse | |
| 3,651,186 | 3/1972 | Hall | |
| 3,801,690 | 4/1974 | Gilbert | |
| 4,108,937 | 8/1978 | Martinew et al. | 264/532 X |

FOREIGN PATENT DOCUMENTS

| | | |
|---|---|---|
| 58783 | of 0000 | Australia . |
| 60960 | of 0000 | Australia . |
| 290351 | 4/1969 | Australia . |
| 403939 | 6/1970 | Australia . |
| 12388 | 2/1972 | Australia . |
| 14303 | 9/1972 | Australia . |
| 52331 | 6/1973 | Australia . |
| 23384 | 2/1974 | Australia . |
| 36400 | 3/1975 | Australia . |
| 60614 | 1/1976 | Australia . |
| 31996 | 12/1977 | Australia . |
| 54-69177 | 6/1979 | Japan .................................. 264/532 |

*Primary Examiner*—Jan H. Silbaugh

[57] ABSTRACT

Herein disclosed are a bottle of a saturated polyester resin and its method of production. According to the method of the present invention, saturated polyester resin is injection-molded into a parison which is composed of a mouth and a barrel. The mouth of the parison is oriented in the direction of the axis of the parison and in a direction perpendicular to the parison's axis by means of an orienting jig. The barrel of the parison is biaxially oriented by a blow-molding process. The bottle thus produced has been oriented as a whole.

2 Claims, 12 Drawing Figures

FIG. 1
FIG. 2
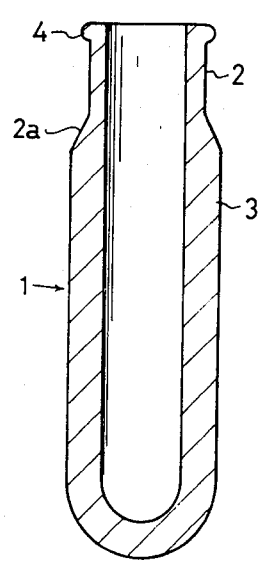
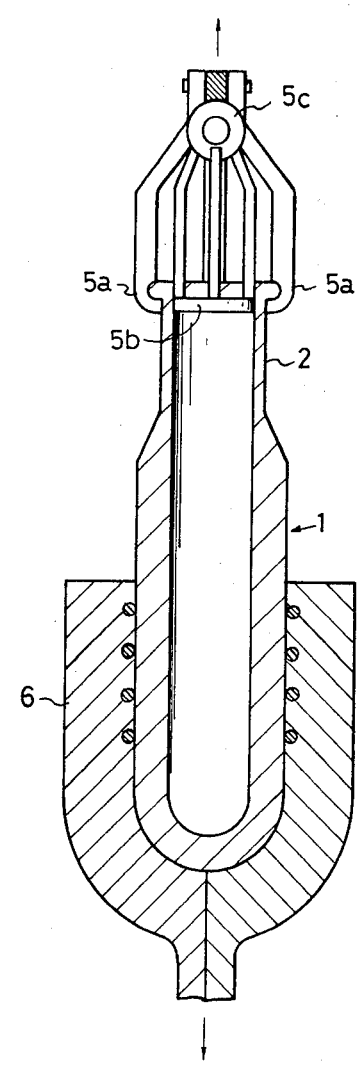

PRODUCTION OF A BOTTLE OF SATURATED POLYESTER RESIN

This is a division, of application Ser. No. 082,698, filed Oct. 9, 1979.

BACKGROUND OF THE INVENTION

1. Field of the Invention

The present invention relates to a saturated polyester resin bottle, which has its parison oriented not only at its barrel but also at its mouth, and to a method for producing the same.

2. Description of the Prior Art

A bottle of a saturated polyester resin is known to be free from exudation of a solvent or the like and from generation of poisonous gases, when it is burned after it is disposed, and to be excellent in its durability. However, these excellent properties and durability of the saturated polyester resin can be exhibited only in case the article made of the saturated polyester resin is subjected to an orienting treatment.

Bottles of saturated polyester resin are produced, from a parison of tubular material prepared by an injection-molding process which is then oriented before it is blow-molded into the desired bottle shape.

The blow-molding of the parison, is performed only at the barrel of the parison while the mouth of the parison is held in a mold therefor. As a result, the barrel of the product bottle has been subjected to the orienting treatment whereas the mouth of the same is left unoriented.

Thus, the bottle barrel exhibits the excellent properties and durability intrinsic to the saturated polyester resin to a sufficient extent whereas the bottle mouth fails to sufficiently exhibit those excellent properties. For instance, if the bottle is wetted with alcohol of high concentration, this alcohol will penetrate so deeply into the mouth as to whiten and mechanically weaken the mouth and to produce a number of fine cracks which deteriorate the sealing effects of the mouth.

SUMMARY OF THE INVENTION

It is therefore an object of the present invention to provide a bottle of a saturated polyester resin and a method of producing the same, which are free from the serious drawbacks concomitant with the prior art.

Another but major object of the present invention is to provide not only a saturated polyester resin bottle, which has excellent properties and durability due to orienting the bottle as a whole, but also a method of producing same.

A further object of the present invention is to make it possible to easily orient the mouth of a parison, which has its both ends open, in the direction perpendicular to the axial direction of the parison, and to form a thread on the outer circumference of the mouth during the subsequent blow-molding process even if the mouth is oriented in the axial direction of the parison.

According to one aspect of the present invention, there is provided a method of producing a bottle of a saturated polyester resin by preparing a parison of a saturated polyester resin by an injection-molding process and by biaxially orienting said parison, comprising the steps of: heating only the mouth of said parison to an orientable temperature and orienting said mouth along the axis of said parison by means of an orienting jig; and heating the barrel of said parison to a biaxially orientable temperature and blow-molding said parison in a mold.

According to another aspect of the present invention, there is provided a bottle of a saturated polyester resin, which is produced by injection-molding a saturated polyester resin into a parison composed of a mouth and a barrel and by biaxially orienting said barrel while holding said mouth, characterized in that the mouth of said parison is oriented along the axis of said parison.

BRIEF DESCRIPTION OF THE DRAWINGS

Other objects and advantages of the present invention will become apparent from the following description made with reference to the accompanying drawings, in which:

FIG. 1 is a sectional view of a parison prepared according to a first embodiment of the present invention;

FIG. 2 is an explanatory view illustrating the condition, under which the parison has its mouth oriented by means of an orienting tool;

DESCRIPTION OF THE PREFERRED EMBODIMENTS

Figure 3:
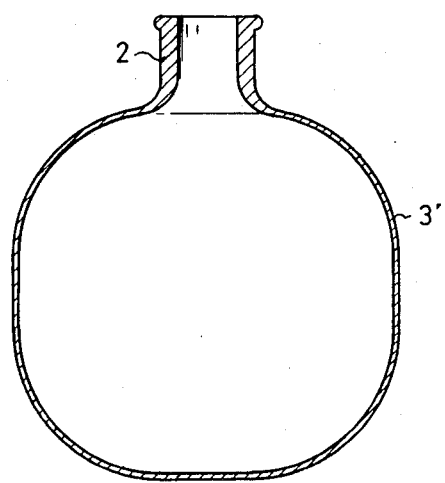
FIG. 3 is a sectional view showing an intermediate product which is prepared by blow-molding the barrel of the parison before the mouth is oriented.

A first embodiment of the present invention will now be described with reference to FIGS. 1 to 5. First of all, saturated polyester resin is molded into a parison 1 by an injection-molding process. The parison 1 is composed of a mouth 2 having its one end opened and a barrel 3 extending downward from the mouth 2 and having its bottom closed. The mouth 2 is made thinner than the barrel 3 and is formed at its upper end with an annular land 4. Mouth 2 is thinner than barrel 3 because preferably only the former is oriented when the parison 1 is extended for orientation of the mouth. There is formed between the mouth 2 and the barrel 3 a shoulder 2a which gradually thickens to merge into the barrel 3. This is partly because the mouth 2 can be subjected as a whole to uniform orientation and partly because orientation to some extent is effected, when the mouth 2 is to be oriented, even at the shoulder 2a which might otherwise be less oriented during the subsequent blow-molding process of the barrel 3. On the other hand, in case the orientation at the mouth 2 can be taken to a large extent and in case an excellent heated condition of the mouth 2 can be attained, the mouth 2 may be as thick as the barrel 3. In this instance, the mouth 2 can be subjected to large orientation.

Next, the parison 1 is held at its barrel 3 by means of a holder 6, and only the mouth 2 is heated to an orientable temperature, e.g., a glasstransition temperature. After that, an orienting tool 5 is used to clamp the annular land 4 of the mouth 2 by its clamping palms 5a. Thereafter, the orienting tool 5 is pulled along the longitudinal axis of the parison 1, as shown at arrow, so that the mouth 2 is extended and oriented.

The orienting tool 5 to be used in the first embodiment is composed of an annular ring 5b adapted to be fitted in the opening of the mouth 2, and the aforementioned clamping palms 5a which are swingable about an arm 5c. The pulling force is applied to the arm 5c, and thence to palms 5a and mouth 2. The orienting tool 5 need not be limited to that described hereinbefore. Rather any tool which can clamp the upper end of the mouth 2 without fail may be used. Holder 6 is composed two semicylindrical halves which are lined on their inner walls with a frictional material so that they can be joined to hold the parison 1 in position. Preferably, when holding parison 1, holder 6 should be spaced as far as practicable from the mouth 2 so that heating of the mouth 2 is not irregular.

After orienting the mouth, the barrel 3 of the parison 1 is subjected to blow molding so that it may be converted into the end product bottle. During this molding process, the parison 1 is held in a mold by the use of ordinary means, and the bottom of the parison 1 is blown so that the barrel 3 may be expanded and biaxially oriented.

Figure 4:
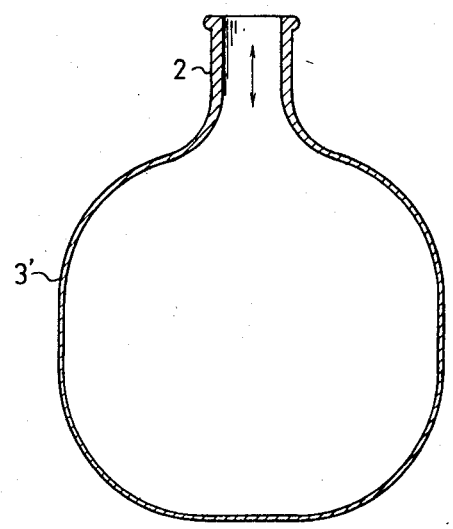
FIG. 4 is also a sectional view showing a bottle which is produced by orienting the mouth of the intermediate product of FIG. 3.

Although, in the foregoing description, the mouth 2 is oriented prior to the barrel 3, the order may be reversed such that a barrel 3' is oriented, as shown in FIG. 3, and the mouth 2 is subsequently oreinted, as shown in FIG. 4. If the barrel is oriented prior to the mouth in accordance with the modification, it is preferable that the extending force for orienting the mouth to be applied between the land at the lip of the mouth and the shoulder of the bottle.

By following the aforementioned steps, the desired bottle can be produced.

Figure 5:
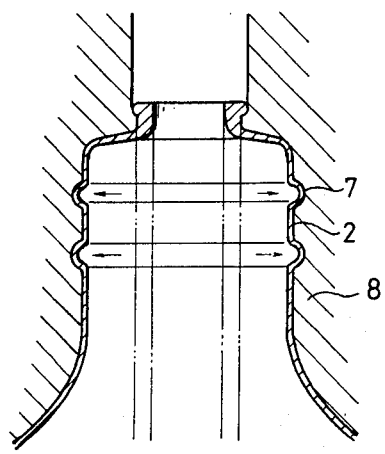
FIG. 5 is also a sectional view but shows an essential portion under the condition having the mouth of FIGS. 2 and 4 formed with a thread.
Figure 6:
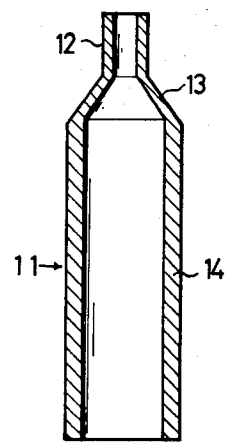
FIG. 6 is a sectional view of a parison prepared according to a second embodiment of the present invention.
Figure 7:
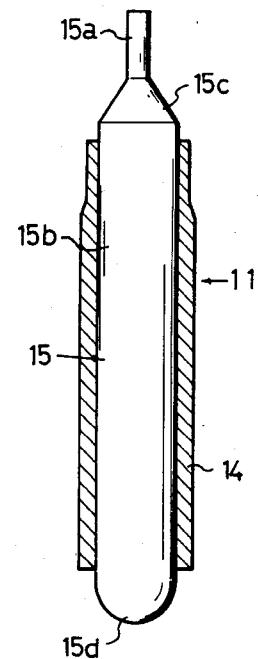
FIG. 7 is also a sectional view showing the condition, under which the mouth of the parison is oriented.

In event that the mouth is formed by orientation, any thread formed on the outer circumference of the mouth which is prepared in advance during the previous injection molding process may be deformed during the subsequent orientation. This is, of course, undesirable. Therefore, if a thread 7 is to be formed on the mouth of the bottle, this bottle should be fitted, after it is molded, in a mold 8 formed with a thread forming groove, as shown in FIG. 5, so that the desired thread 7 is formed on the mouth by the blow-molding process. In this instance, the bottle once prepared is fitted in the mold 8, and the upper end of the mouth is not subjected to the blow-molding process so that it is left unoriented. This particular upper end may be either left as it is or cut away so long as there arises no trouble when a cap is fastened to that mouth. In this instance, incidentally, it can be said that the mouth has been biaxially oriented.

As has been described hereinbefore, according to the present invention, even the mouth, which cannot usually be oriented because of the holding manner of the parison, can be oriented. This can ensure the orientation of the bottle as a whole. As a result, the bottle produced according to the present invention can exhibit excellent instrinsic physical properties and enjoy the durability of saturated polyester resin.

The present invention will be further described with reference to FIGS. 6 to 9 in connection with a second embodiment thereof, which is different from the first embodiment in that the mouth of the parison is oriented in a perpendicular direction to the axis of the parison. A parison 11 of a saturated polyester resin is injection-molded into a tube having both its ends open, in which a mouth 12 of a smaller diameter is made to merge through a shoulder 13 into a barrel 14 of a larger diameter.

The parison 11 thus prepared is held at its barrel 14 by means of a suitable holder, and has its mouth 12 and shoulder 13 heated to such a temperature of about 100° C. as is proper for subsequent orientation. The holder to be used in this second embodiment may be of similar to the type used in the first embodiment, that is, composed of a pair of semicylindrical halves which are made coactive to clamp the barrel 14. A rod-shaped jig 15 is forced upward from the bottom into the parison 11 under its heated condition so that the mouth 12 is oriented in the perpendicular direction to the axis of the parison 11. The aforementioned rod-shaped jig 15 has its head 15a reduced to have a smaller outer diameter than the inner diameter of the mouth 12 of the parison 11 and its body 15b expanded to have a slightly smaller outer diameter than the inner diameter of the barrel 14 of the parison 11. Between the head 15a and the body 15b of the rod-shaped jig 15, there is formed a shoulder 15c which is tapered. Moreover, the bottom 15d of the rod-shaped jig 15 is rounded, as shown.

Figure 8:
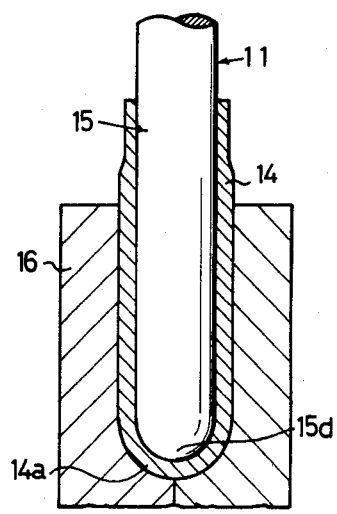
FIG. 8 is also a sectional view showing the condition, under which the rounded bottom of the parison is formed by closing the lower end of the parison.

At the next step, the barrel 14 of the parison 11 is heated locally at its lower end and is inserted into a mold 16 shown in FIG. 8 so that a rounded bottom 14a is formed with the use of the rounded bottom 15d of the aforementioned rod-shaped jig 15. The formation of the bottom 14a of the barrel 14 is performed by bending inwardly the lower end of the barrel 14 to temporarily and by subsequently forcing it to merge between the bottom 15d of the rod-shaped jig 15 and the mold 16. As an alternative, the bottom 14a of the barrel 14 may be formed by fusing a suitable bottom forming member to the lower end of the barrel 14. Incidentally, the formation of the thread on the mouth 12 of the parison 11 may be in a similar manner to that described with respect to the first embodiment.

Figure 9:
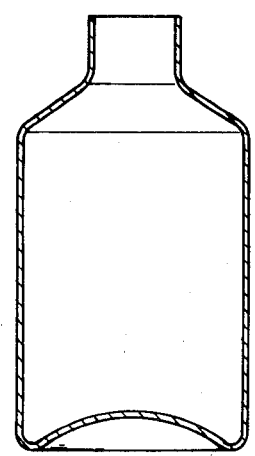
FIG. 9 is also a sectional view showing a bottle which is produced by blow-molding the parison shown in FIGS. 6 to 8.

After the parison 11 having the rounded bottom 14a has been formed as described above, it is heated and is subjected to usual blow-molding in a mold thereby to produce the bottle shown in FIG. 9. During this blow-molding process, the barrel of the parison 11 is biaxially oriented.

Since the second embodiment of the present invention is carried out in the aforementioned procedures so that the bottle of a saturated polyester resin has not only its barrel but also its mouth oriented, cracking which might otherwise be liable to take place in the mouth 15 prevented. Moreover, the orientation of the mouth can be performed with ease merely by forcing the rod-shaped jig into the parison having its both ends opened.

Figure 10:
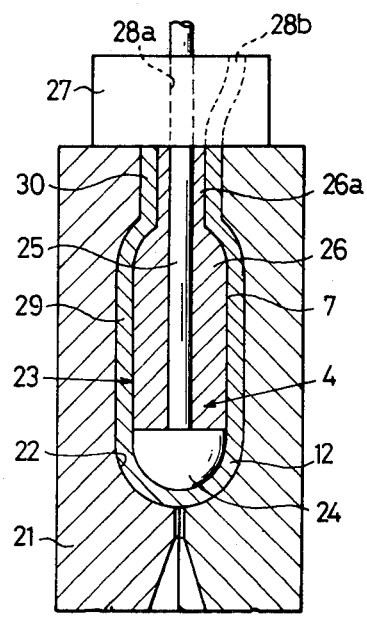
FIG. 10 is a sectional view showing the condition, under which a parison is molded according to a third embodiment of the present invention.
Figure 11:
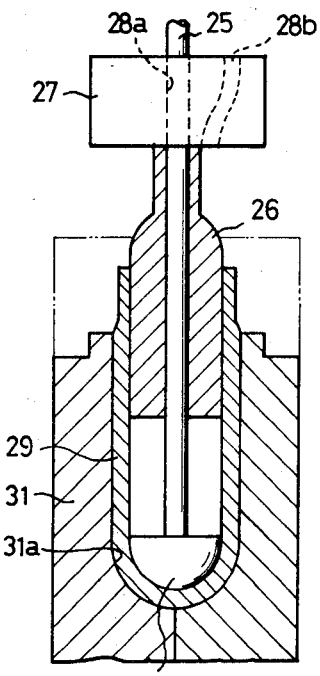
FIG. 11 is also a sectional view showing the condition, under which the mouth of a parison of FIG. 10 is oriented.
Figure 12:
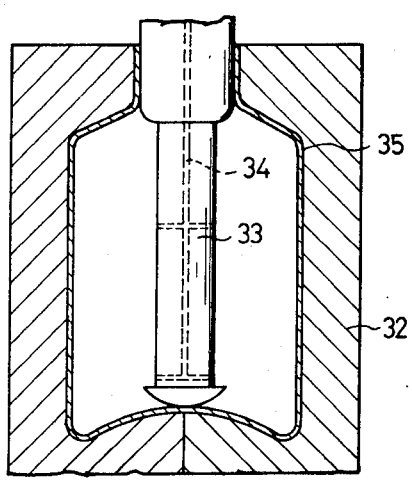
FIG. 12 is also a sectional view showing the condition, under which the barrel of a parison of FIGS. 10 and 11 is blow-molded.

A third embodiment of the present invention will be described with reference to FIGS. 10 to 12. This third embodiment is similar to the second embodiment in that the mouth of the parison is oriented in the perpendicular direction to the axis of the parison but is characterized in that a core mold to be used in injection molding is also used in the orientation of the mouth.

First of all, a parison is molded of a saturated polyester resin by injection molding. This molding process will be described with reference to FIG. 10. As shown, a female mold 21 is formed with a cavity 22 which is used to determine the contour of the parison. There is fitted in the cavity 22 a core mold 23 which is used to determine the shape of the inner wall of the parison. The core mold 23 is composed of a semispherical mushroom head 24, which is located at the lower end, and an orienting member 26 which is mounted slidably on a stem 25 extending upward from the mushroom head 24. The orienting member 26 of the core mold 23 has its upper portion 26a reduced to correspond to the mouth of the parison. An upper mold 27 for covering the upper end of the female mold 21 is seated upon the upper end of the reduced portion 26a of the orienting member 26. The upper mold 27 thus seated is formed with a through bore 28a for admitting the stem 25 of the core mold 23 therethrough so that the orienting member 26 may be guided, when it is pulled up, as will be described later. The upper mold 27 is further formed with a pouring gate 28b, through which a molten saturated polyester resin is injected into the cavity 22.

Thus, in case it is intended to injection-mold a parison 29, the molten material of the saturated polyester resin is injected through the pouring gate 28b into the space formed between the aforementioned female and core molds 21 and 23. After the parison 29 has been molded, the female mold 21 is opened and removed, and the mouth 30 of the parison 29 is heated to a temperature about 100° C., while leaving the core mold 23 fitted in the parison 29. After that, the parison 29 is held in a holder 31 shown in FIG. 11. This holder 31 is formed with a cavity 31a for receiving the bottom of the parison 29. Then, the orienting member 26 is extracted upward while pushing on the bottom of the parison 29 with the mushroom head 24. The portion of the orienting member 26 having a larger diameter passes through the mouth 30 of the parison 29, thereby orienting mouth 30 in the perpendicular direction to the parison's axis. In this meanwhile, incidentally, the barrel of the parison is being cooled.

After that, the parison 29 is molded into a bottle by a usual blow-molding process. This molding process is accomplished by heating the parison to a blow-molding temperature, and then by injecting compressed air into the parison 29 while this parison 29 being inserted into a mold 32 shown in FIG. 12 and having its bottom pushed by a push rod 33. Thus, a bottle 35 of a saturated polyester resin having its barrel biaxially oriented can be produced.

As has been described hereinbefore, according to the present invention, the mouth of the parison can be oriented with such remarkable ease that it can have its mechanical strength increased to be free from any cracking. Moreover, since the extraction of the orienting member 26 can be performed while the bottom of the parison being pushed down by means of the mushroom head 24, the orientation of the mouth can be accomplished accurately. On the other hand, the extraction of the orienting member itself can be performed at such a speed as can be free from having the residual strain due to the orientation left at the mouth.

What is claimed is:

1. A method of producing a bottle of a saturated polyester resin by preparing a parison of a saturated polyester resin by an injection-molding process and by biaxially orienting said parison, comprising the steps of: injecting molten material of saturated polyester resin into a mold defined by a female mold member and a core mold member fitted therein, said core mold member being comprised of a first, mushroom head shaped part constituting the lower portion of the mold member, and a second part constituting the upper portion of said core mold member, said female mold member and said core mold member being arranged to form a parison having an open mouth portion and a larger diameter barrel portion; heating only the mouth portion of said parison to an orientable temperature; biaxially orienting said mouth portion by holding the bottom of said parison against said female mold member with said first part of said core mold member and simultaneously extracting said second part of said core mold member from the mouth of said parison to thereby widen and lengthen said mouth portion of the parison, so that said parison is biaxially oriented; and heating the barrel portion of said parison to a biaxially orientable temperature; and blow molding said parison in a mold in conjunctfion with a removable means being held within said parison.

2. The method as set forth in claim 1, wherein said second part of said core mold member comprises a first section whose diameter corresponds to the inside diameter of the barrel portion of the parison, a second section of upwardly decreasing diameter corresponding in shape to the inside area of the parison that is found between the mouth portion and the barrel portion, and a third section whose diameter corresponds to the inside diameter of the mouth portion of said parison.

* * * * *